United States Patent Office 3,006,975
Patented Oct. 31, 1961

3,006,975
DEHYDROGENATION PROCESS
Lloyd B. Ryland, El Cerrito, and Carroll Z. Morgan, Alameda, Calif., assignors to Shell Oil Company, a corporation of Delaware
No Drawing. Filed Dec. 17, 1959, Ser. No. 860,085
7 Claims. (Cl. 260—669)

This invention relates to a new and useful process for the dehydrogenation of normal butylenes and their higher homologues having up to about 7 carbon atoms to butadiene and the corresponding diolefinic homologues, ethyl benzene and its higher homologues to styrene and its corresponding homologues, and ethyl pyridine and its higher homologues to vinyl pyridine and its corresponding homologues.

The named products have been produced commercially from the named starting materials by catalytic dehydrogenation with steam using a so-called water gas-active dehydrogenation catalyst based on iron oxide. These catalysts consist mainly of iron oxide and potassium carbonate and generally contain a small amount of a stabilizer such as an oxide of Cr, Mn, Bi or Cu. It is known that under the conditions of use the iron is converted to magnetite ($Fe_3O_4$) if not originally incorporated as such in the catalyst. Also the potassium is generally incorporated as the carbonate but is converted to the carbonate if incorporated in some other form. The potassium carbonate is an essential ingredient of these water-gas active catalysts.

While these catalysts are used commercially, they are not without shortcomings. The first of these is that the yields of desired products are poor except when the conversion is limited to low values. By operating at low conversions, selectivities around 70 to 80% are obtained, but this then requires processing and recycling a large amount of material which, with the large ratio of steam to feed required, is quite costly. On the other hand, low selectivities cannot be tolerated due to the high cost of the feed material and the added expense of recovering the desired product from the large amount of side reaction products. Furthermore, the prior catalyst has a low mechanical strength which, while sufficient to charge the reactor, is not sufficient to prevent the formation of considerable fines during processing. These fines plug the catalyst bed and must be periodically removed by screening the catalyst. This difficulty is also aggravated by the fact that due to the content of potassium carbonate, the catalyst is extremely hygroscopic and therefore requires extra precautions in storing, handling, and charging the reactors.

We are aware that U.S. Patent No. 2,870,228 to W. E. Armstrong and C. Z. Morgan discloses the incorporation of a small amount of alkali metal phosphate in the above-mentioned catalyst. In this case the phosphate, regardless of the form in which it is incorporated in formulating the catalyst, is ultimately found in the form of water soluble potassium ortho phosphate and the iron, as before, exists in the form of $Fe_3O_4$. The catalyst still contains as an essential component an appreciable amount of potassium in the form of potassium carbonate. The concentration of phosphorus calculated as $PO_4^=$ must be retained quite low or else the activity of the catalyst is repressed.

An object of the invention is to provide an improved process for carrying out the mentioned dehydrogenation reactions more selectively without sacrificing activity. Another object of the invention is to provide a process wherein plugging difficulties due to low mechanical strength and hygroscopic nature of the catalyst are avoided. Another object of the invention is to provide a process wherein the mentioned dehydrogenation reactions may be carried out with a less costly catalyst which can be quickly regenerated and is not subject to wildness of the presence of nickel-containing steels.

We have found that the above-described dehydrogenation reactions may be advantageously carried out with a catalyst which while containing iron oxide has a quite different composition and properties than the water-gas active catalysts hitherto employed. According to our invention, we carry out the specified dehydrogenations in the manner later described with a catalyst consisting essentially of iron, oxygen, and phosphorus and/or arsenic and which is free of alkali metals. The term "consisting essentially" means that the catalyst consists of the named ingredients and is devoid of any ingredient which will materially alter the character of the catalyst, but that minor amounts of normal impurities or substantially inert materials which do not materially alter the catalytic properties may be present. Such materials as platinum, palladium, alkaline and alkaline earth metal carbonates and phosphates are excluded because their inclusion materially alters the fundamental properties of the catalyst. The inclusion of even an appreciable amount of sand would not be excluded since it would be completely inert.

The catalyst is devoid of any catalytic amount of alkali metal carbonate, phosphate or arsenate, and is, in fact, not alkaline. Also the phosphorus or arsenic is not in water soluble form nor in the form of any recognizable iron phosphate or arsenate. While the form of the phosphorus or arsenic in the catalyst is not known positively the evidence indicates that it is present in the form of a chemisorbed complex phosphate, or arsenate located primarily at the surface of the ultimate particles of iron oxide. The catalyst as freshly prepared is amorphous to X-rays; after use the characteristic lines of $Fe_3O_4$ appear but no indication of any crystalline iron phosphates or arsenates of definite stoichiometry. Also, the phosphorus and/or arsenic content may be varied at will within wide limits and does not correspond to the stoichiometric ratio of any known iron phosphate or arsenate. Also, the maximum amount of phosphorus and/or arsenate that may be incorporated in this fashion varies with the polymeric state of the phosphorus and/or arsenic applied, again indicating an adsorption phenomenum rather than a stoichiometric reaction.

The catalyst is prepared by hydrolyzing an iron salt in the presence of an alkali metal phosphate and/or arsenate. For this one may use any of the water soluble iron salts which may be hydrolyzed to form insoluble iron hydroxide by reaction with an alkali, e.g. ammonium hydroxide. We prefer to use ferric sulfate but other water soluble ferric and ferrous salts such as the chloride, nitrate, acetate, and the like can be used. The preferred base is ammonium hydroxide but other known bases, such as sodium hydroxide, that will precipitate the iron hydroxide can be used.

The phosphate may be supplied as a water soluble ortho phosphate, e.g. an alkali metal phosphate or ammonium phosphate or ammonium acid phosphate or phosphoric acid. However, we much prefer a soluble polyphosphate. The term "polyphosphate" is used here to include the trimetaphosphate and tetrametaphosphate

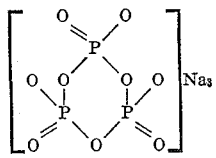

and

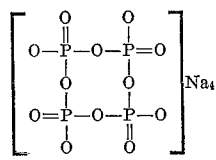

which upon reaction with alkali split to the corresponding tri- and tetra polyphosphates.

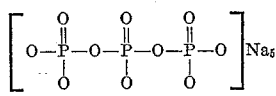

and

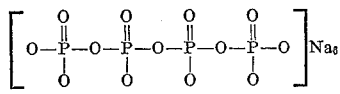

Also included are the iso metaphosphates and other polyphosphates having ill-defined structures generally believed to be complex compounds involving both of the structures. The polyphosphate may have a polymerization number around 500, i.e. 500 phosphorus atoms per molecule. As will be further expalined these higher polyphosphates having a polymerization number of 100 or above are the preferred materials.

The polyphosphate may be used in the form of any water-soluble alkali metal or ammonium salt. As will be apparent from the later description, the alkali metal is not retained in the catalyst when an alkali metal polyphosphate is used. While the polyphosphate should be water soluble a high solubility is not necessary since as the polyphosphate is progressively taken up by the iron oxide surface more of the polyphosphate dissolves; thus a solubility of even less than 1 gram per 100 cc. of water is ample.

If desired, instead of using the alkali metal or ammonium salt of the polyphosphate one can pass a solution of the alkali metal polyphosphate through a bed of an acid ion exchange resin thereby converting the alkali metal polyphosphate to the corresponding alkali metal-free poly acid.

Instead of a phosphate an arsenate may be used or the two may be used together in any proportions. The arsenate may be $As_4O_6$, $As_2O_5$, or a water soluble salt thereof such as sodium arsenate, or arsenite.

In the preferred method for preparing the catalyst the phosphate or arsenate is added to a solution of the iron salt and then the base is slowly added to precipitate the hydrous iron oxide. During this hydrolysis the phosphorus and/or arsenic is taken up by an anion exchange reaction on the surface of the precipitate as it is formed. As long as there is an excess of polyphosphate available the amount of phosphorus taken up is a function of the polymer number of the polyphosphate. If the precipitation is carried out to neutrality in the presence of an excess of sodium ortho phosphate the maximum amount of phosphorus taken up will be much less than when using a polyphosphate having a polymerization number of, say 300.

The amount of phosphorus and/or arsenic used in the preparation of the catalyst should be at least 110% of the amount desired to be incorporated and may be up to at least 300% or even higher.

The precipitated hydrous iron oxide-phosphorus composition produced as above is water-washed and therefore contains no appreciable amount of fixed alkali metal compounds or other water soluble material, including any uncombined polyphosphate. The material is then dried and generally subjected to a mild calcination, e.g. 4 hours at 600° C. This calcination is however not essential.

While the invention does not depend on the correctness of any theory the evidence indicates that the manner of incorporating the phosphorus, using for example ferric sulfate as the starting material, is as follows: As the pH of the iron sulfate solution is increased by the addition of the base, e.g. ammonium hydroxide or sodium hydroxide, so-called hydrous ferric oxide begins to precipitate. This is not actually $Fe(OH)_3$ but a material which may be indictated by the general formula $(FeOH_x) \cdot 0.5(SO_4)_y$, where $x$ and $y$ vary monotonously as the pH changes. The polyphosphate anion then displaces the sulfate radical in this material. Thus, by merely titrating ferric sulfate with ammonium hydroxide it is found that all of the iron is precipitated long before the amount of sodium hydroxide stoichiometrically required according to the equation

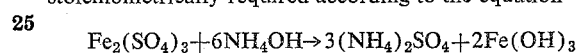

is reached. Also if such a titration is stopped at various pH values and the precipitate analyzed after washing free of solubles, it is found that the sulfate content is quite high, e.g. 10%, at a low pH and the amount decreases as the final pH is raised. On the other hand, in the presence of the added phosphate and at any given chosen final pH it is found that there is an inverse linear relationship between the amount of phosphorous combined and the amount of sulfate remaining fixed to the hydrous iron oxide after washing. When an ortho phosphate or pyrophosphate is used this displacement is generally far from complete and it is possible only to incorporate relatively small amounts of combined phosphorus. When a polyphosphate, and particularly one having a high polymerization number, is present in excess the exchange is complete and much higher and more effective concentrations can be incorporated. The amount of phosphorus and arsenic incorporated by this procedure is dependent upon the amount of alkali added during the hydrolysis, i.e. on the final pH. As pointed out above, the final pH also controls the amount of original anion, e.g. sulfate, retained. If the hydrolysis is terminated at a relatively low pH, say around 6, it is possible to combine relatively large concentrations of polyphosphate, up to say 15%, calculated as $P_2O_5$. In order to produce a product in which the anion of the iron salt is mainly removed it is desirable to bring the pH up to at least 6 and preferably at least 7 and it may be brought up to 9 or even 10.

While, in general, we prefer to operate under conditions where the sulfate or other anion of the iron salt used is substantially all displaced, any remaining sulfate or other anion is removed relatively rapidly under the conditions of use of the catalyst and therefore is not particularly detrimental.

Although effective catalysts may be made with relatively low concentrations of combined, water-insoluble phosphorus equivalent to about 2% $P_2O_5$, we prefer to incorporate higher concentrations in the range of about 5% $P_2O_5$ up to the maximum that can be bound in water insoluble form. These higher concentrations, as explained above, are obtained by using an excess of a polyphosphate of relatively high polymerization number with a final pH below about 9. A most useful range is between about 8 and 20%, calculated as $P_2O_5$, and based on the total catalyst weight.

The catalyst may be formed into pieces of any desired shape by known methods or may be used as a powder or it may be used in the form of crushed granules. The catalyst is exceptionally strong mechanically and is not hygroscopic.

The process of the invention is useful for the dehydrogenation of any of the above mentioned materials alone or when in admixture with each other or with other inert hydrocarbons. It is particularly useful for the simultaneous dehydrogenation of normal butenes and isoamylenes to form a mixture of butadiene and isoprene, or the simultaneous dehydrogenation of isoamylenes and ethyl benzene to form a mixture of isoprene and styrene. Paraffins, naphthenes and aromatic hydrocarbons such as benzene, toluene, xylene, if present, are inert and act only as diluents.

The process is effected at relatively low pressures of from about one quarter atmosphere up to about 3 atmospheres absolute. The dehydrogenation is normally started at around 560 to 590° C. when the catalyst is fresh and during the course of time the temperature is gradually increased to maintain the desired conversion. When over a course of months the temperature is increased to around 690° C. it is generally advisable to supply a new charge of catalyst. If a fluidized powder system is used the catalyst may be continuously or intermittently replenished, e.g. at ½% of inventory per day, and thereby maintained at a constant activity. The mole ratio of steam to hydrocarbon in the feed to the reaction zone may be as low as 2:1 and may be as high as desired, e.g. 30:1.

In operation, the hydrocarbon feed is vaporized and preheated to a temperature which is near but generally somewhat below the desired dehydrogenation temperature. The hydrocarbon may be preheated alone or along with all or part of the steam. It is preferred, however, to separately preheat the steam to a temperature somewhat above the desired dehydrogenation reaction temperature so that upon mixing with the preheated hydrocarbon the desired reaction temperature is attained.

The reactant is passed in contact with the catalyst at a relatively high space velocity, e.g., a gaseous hourly space velocity (GHSV) of 150 to 1500 (calculated on a steam-free basis) and the reaction products are then quickly quenched to a temperature below about 500° C. either by indirect heat exchange in a cooler or by direct contact with a quench liquid, e.g., water. The product is then further cooled to condense the steam and the hydrocarbon products. After removing the condensed water and some uncondensible gases, the desired dehydrogenated product is separated from the remaining reaction mixture by known methods, e.g., by fractional distillation, extractive distillation, liquid-liquid extraction, or the like.

Aside from the very gradual deactivation of the catalyst over a long course of time there occurs a temporary loss of activity over a course of hours which is believed to be due primarily to a small change in the oxidation state of the iron. It is therefore necessary to periodically restore the catalyst activity. In the case of the prior art catalyst containing potassium carbonate this is done by stopping the flow of feed and continuing the flow of the steam for several hours. In the present process it is necessary to supply air or oxygen along with the steam during such reactivation, but the regeneration may be effected in a shorter time, e.g., ¼ to 5 hours. The amount of air or oxygen supplied should be adjusted such that the vapor contains between about 1 and 10% oxygen, e.g., 2%. The presence of the steam tends to prevent excessive oxidation.

The process is a catalytic dehydrogenation process and not an oxidative dehydrogenation process. However, if desired a small amount of oxygen, e.g. 0.5 to 1% may be included during the processing step. This small amount of oxygen reacts mainly with the hydrogen liberated by the catalytic dehydrogenation reaction thereby lessening the mass action effect of the liberated hydrogen and allowing somewhat higher conversions to be attained at a given temperature.

EXAMPLES

The catalysts described in the following examples were evaluated in a standardized test in which n-butylenes were passed through a bed of the catalyst (10–20 mesh particles) in a heated stainless steel tubular reactor at a gaseous hourly space velocity of 250, atmospheric pressure, a temperature of 620° C. and with 12 moles of steam per mole of butylene. After a period of use the catalysts were regenerated by purging of hydrocarbon vapors and then passing a mixture of air and steam over the catalyst for about 20 minutes. In this the steam rate was the same as during the processing and the steam to oxygen mole ratio was about 14:1.

The conversion of the butylene and the selectivity to the production of butadiene were determined after one hour of use of the catalyst which had been regenerated at least once. In this standard test the commercial 205 catalyst affords a conversion of 34–37% and a selectivity of 76–77%, over a 2.5 hour period. The best of those catalysts shown in the table in U.S. Patent No. 2,870,228 which contained 4.6 to 9.0% $K_3PO_4$ (1.5–3.0% $P_2O_5$) gives at 35% conversion a selectivity of 80%.

*Example 1.*—A catalyst was prepared at about 23° C. by diluting 1.7 liters of 1 molar ferric sulfate to 2.6 liters total volume with distilled water. To this was added 34.6 grams of sodium polymetaphosphate (polymerization number about 280) that had been dissolved in 1.16 liters of distilled water. A 6.2 molar solution of ammonium hydroxide was added with stirring to bring the pH to about 8. The product was filtered on a Buchner funnel and washed with 5 consecutive changes of distilled water to remove soluble salts. The filter cake was dried 3 days at 120° C. and crushed to pass a 10 mesh sieve. The hard 10–20 mesh particles were calcined in air for 4 hours at about 600° C. Virtually all of the initial phosphate remained in the finished catalyst (7.5% calculated as $P_2O_5$). The sulfate content was only 0.03%. After 1 hour under the test conditions outlined above this catalyst still gave 31.5% conversion with about 87% selectivity to butadiene.

*Example 2.*—A catalyst was prepared in the same manner as described in Example 1 except that the final pH of precipitation was 9.5 instead of 8.0. The catalyst contained 7.6% polyphosphate (calculated as $P_2O_5$) and 0.02% sulfate. The following Table 1 shows the conversion and selectivity obtained with this catalyst as a function of time.

*Table 1*

| Hours | Percent conversion of n-butylenes | Percent selectivity to butadiene |
| --- | --- | --- |
| 0.5 | 36.1 | 86.9 |
| 1.0 | 32.8 | 89.3 |
| 1.5 | 30.8 | 90.3 |
| 2.0 | 27.9 | 89.7 |
| 2.7 | 24.9 | 89.7 |

*Example 3.*—A catalyst was prepared in the same manner as that described in Example 1 except that the precipitation was carried out at about 70° C. The following Table 2 shows the conversion and selectivity obtained with this catalyst as a function of time.

*Table 2*

| Hours | Percent conversion of n-butylenes | Percent selectivity to butadiene |
| --- | --- | --- |
| 0.5 | 33.8 | 87.0 |
| 1.0 | 32.3 | 87.6 |
| 2.0 | 31.5 | 85.0 |
| 2.3 | 23.5 | 88.0 |

*Example 4.*—A catalyst was prepared by diluting 1.6 liters of 1 molar ferric sulfate to 2.6 liters total volume with distilled water. To this was added 0.116 liter of 4.36 molar orthophosphoric acid that had been previously diluted to 1.6 liters. The hydrolysis was carried out by rapid addition of 6.08 normal ammonium hydroxide with good stirring. The pH was followed during the addition and at about 3.7 the soft gel was diluted with 1 liter of distilled water. The addition of amomnium hydroxide was then continued to a final pH of 8. The precipitate was filtered, washed, dried and calcined as in Example 1. About one-half of the initial phosphate remained as bound phosphate in the catalyst (i.e., about 5.5% calculated as $P_2O_5$). The sulfate content was 0.03%. After 50 minutes under the test conditions outlined above this catalyst still gave 26% conversion with 90% selectivity to butadiene.

*Example 5.*—In a similar manner a catalyst was made by hydrolyzing ferric sulfate in the presence of sodium meta arsenite with ammonium hydroxide to a pH of 9.5. Arsenic was bound by chemisorbtion (9.2% calculated as $As_2O_3$).

*Example 6.*—A solution of a sodium polyphosphate having a polymerization number of about 280 was passed slowly through a bed of acidified ion exchange resin (Dowex 50). The resulting solution of acid polyphosphate was combined with a solution of ferric sulfate and the iron salt was hydrolyzed by the addition of ammonium hydroxide to a final pH of 6.1. The chemisorbed phosphate, calculated as $P_2O_5$ was 15.6%.

We claim as our invention:

1. In a procees for the catalytic dehydrogenation of a normal butene to 1,3-butadiene in the presence of added steam, the improvement which comprises contacting the normal butene and steam at a temperature between about 560 and 690° C. and a gaseous hourly space velocity between about 150 and 1500 and a pressure between about 1/4 to 3 atmospheres absolute for a period of time with a catalyst consisting essentially of iron oxide in an oxidation state corresponding to $Fe_3O_4$ and phosphate in an amount corresponding to between 2 and 20% calculated as $P_2O_5$, said phosphate being chemisorbed in water insoluble from amorphous to X-rays, and intermittently passing over the catalyst at essentially the same reaction temperature in the absence of said n-butene said steam with sufficient air to afford a free oxygen concentration between about 1 and 10% for a period of about 1/4 to 5 hours.

2. In a process for the catalytic dehydrogenation of a normal butene to 1,3-butadiene in the presence of added steam, the improvement which comprises contacting the normal butene and steam at a temperature between about 560 and 690° C. and a gaseous hourly space velocity about 150 and 1500 and a pressure between about 1/4 to 3 atmospheres absolute with a catalyst consisting essentially of iron oxide and phosphorus in the form of a polyphosphate having at least 100 phosphorus atoms per molecule in an amount corresponding to between 2 and 20% calculated as $P_2O_5$, said polyphosphate being chemisorbed on the hydrous iron oxide in water insoluble form amorphous to the X-rays and intermittently passing over the catalyst at essentially the same reaction temperature in the absence of said n-butene said steam with sufficient air to afford a free oxygen concentration between about 1 and 10% for a period of about 1/4 to 5 hours.

3. In a process for the catalytic dehydrogenation of a normal butene to 1,3-butadiene in the presence of added steam, the improvement which comprises contacting the normal butene and steam at a temperature between about 560 and 690° C. and a gaseous hourly space velocity between about 150 and 1500 and a pressure between about 1/4 to 3 atmospheres absolute with a catalyst consisting essentially of iron oxide and phosphate in an amount corresponding to between 2 and 20% calculated as $P_2O_5$ prepared by hydrolyzing a soluble iron salt with an alkali in the presence of a soluble phosphate to a pH of from 6 to 9, washing the precipitate free of soluble salts, drying, and calcining, and intermittently passing over the catalyst at essentially the same reaction temperature in the absence of said n-butene said steam with sufficient air to afford a free oxygen concentration between about 1 and 10% for a period of about 1/4 to 5 hours.

4. In a process for the catalytic dehydrogenation of a normal butene to 1,3-butadiene in the presence of added steam, the improvement which comprises contacting the normal butene and steam at a temperature between about 560 and 690° C. and a gaseous hourly space velocity between about 150 and 1500 and a pressure between about 1/4 to 3 atmospheres absolute with a catalyst consisting essentially of iron oxide in an oxidation state corresponding to $Fe_3O_4$ and arsenic in an amount corresponding to between 2 and 20% calculated as $As_4O_6$, said arsenic being in water insoluble form amorphous to X-rays, and intermittently passing over the catalyst at essentially the same reaction temperature in the absence of said n-butene said steam with sufficient air to afford a free oxygen concentration between about 1 and 10% for a period of about 1/4 to 5 hours.

5. In a process for the catalytic dehydrogenation of ethylbenzene to styrene in the presence of added steam, the improvement which comprises contacting ethylbenzene and steam at a temperature between about 560 and 690° C. and a gaseous hourly space velocity between about 150 and 1500 and a pressure between about 1/4 to 3 atmospheres absolute with a catalyst consisting essentially of iron oxide and phosphate in an amount corresponding to between 2 and 20% calculated as $P_2O_5$, said phosphate being chemisorbed in water insoluble form amorphous to X-rays, and intermittently passing over the catalyst at essentially the same reaction temperature in the absence of said ethylbenzene said steam with sufficient air to afford a free oxygen concentration between about 1 and 10% for a period of about 1/4 to 5 hours.

6. Process for the catalytic dehydrogenation of a reactant selected from the group consisting of olefinic hydrocarbons and alkyl aromatic hydrocarbons to the corresponding diolefin and vinyl derivatives, respectively, which comprises passing said reactant together with steam at a temperature between about 560 and 690° C. and a gaseous hourly space velocity between about 150 and 1500 and a pressure between about 1/4 to 3 atmospheres absolute for a period of time over a catalyst consisting essentially of iron oxide and from about 2 to 20% of a material selected from the group consisting of phosphate and arsenate and mixtures thereof, said phosphate and arsenate being chemisorbed in water-insoluble form amorphous to X-rays, and intermittently passing over said catalyst at essentially the same reaction temperature in the absence of said reactant a mixture of steam and air containing about 1 to 10% oxygen.

7. Process according to claim 6 in which said phosphate is a polyphosphate having a polymerization number of at least 100.

References Cited in the file of this patent

UNITED STATES PATENTS

| | | |
|---|---|---|
| 2,769,811 | Mahan | Nov. 6, 1956 |
| 2,870,228 | Armstrong | Jan. 20, 1959 |